US008594701B2

(12) United States Patent
Pakzad

(10) Patent No.: US 8,594,701 B2
(45) Date of Patent: Nov. 26, 2013

(54) SYSTEM AND/OR METHOD FOR PEDESTRIAN NAVIGATION

(71) Applicant: QUALCOMM Incorporated, San Diego, CA (US)

(72) Inventor: Payam Pakzad, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/649,949

(22) Filed: Oct. 11, 2012

(65) Prior Publication Data

US 2013/0095849 A1 Apr. 18, 2013

Related U.S. Application Data

(60) Provisional application No. 61/545,910, filed on Oct. 11, 2011.

(51) Int. Cl.
H04W 24/00 (2009.01)

(52) U.S. Cl.
USPC ............. 455/456.1; 455/404.2; 455/421; 455/422.1; 455/424; 455/436

(58) Field of Classification Search
USPC ........ 455/456.1, 404.2, 421, 422.1, 424, 436
See application file for complete search history.

(56) References Cited

U.S. PATENT DOCUMENTS

| 8,306,526 | B2* | 11/2012 | Yonezawa | 455/423 |
| 2006/0217127 | A1* | 9/2006 | Drane et al. | 455/456.1 |
| 2007/0149216 | A1 | 6/2007 | Misikangas | |
| 2007/0225912 | A1 | 9/2007 | Grush | |
| 2009/0216437 | A1 | 8/2009 | Meier | |
| 2011/0080848 | A1 | 4/2011 | Khorashadi et al. | |
| 2011/0082638 | A1 | 4/2011 | Khorashadi et al. | |
| 2011/0098051 | A1 | 4/2011 | Kamalaraj et al. | |
| 2011/0178705 | A1 | 7/2011 | Pakzad et al. | |

FOREIGN PATENT DOCUMENTS

| EP | 1494397 A2 | 1/2005 |
| WO | 2010106530 A2 | 9/2010 |
| WO | 2011006527 A1 | 1/2011 |

OTHER PUBLICATIONS

International Search Report and Written Opinion—PCT/US2012/059812—ISA/EPO—Feb. 5, 2013.
Kaiser S et al., "A Maps-based Angular PDF for Navigation Systems in Indoor and Outdoor Environments", Indoor Positioning and Indoor Navigation (IPIN), 2011 International Conference on, IEEE, Sep. 21, 2011, pp. 1-7, XP031990146.
Kaplow R et al., "Variable resolution decomposition for Robotic Navigation under a POMDP Framework", 2010 IEEE International conference on Robotics and Automation : ICRA 2010 ; Anchorage, Alaks, USA, May 3-8, 2010, IEEE, Piscataway, NJ, USA, May 3, 2010. pp. 369-376, XP031743125.
Zhang H et al., "Autonomous Indoor Exploration of Mobile robots based on door-guidance and improved dynamic window Approach", Robotics and Biomimetics (ROBIO), 2009, IEEE Igternational Conference on, IEEE, Piscataway, NJ, USA, Dec. 19, 2009, pp. 408-413, XP031641971.

* cited by examiner

Primary Examiner — Nghi H Ly
(74) Attorney, Agent, or Firm — Berkeley Law & Technology Group, LLP

(57) ABSTRACT

Disclosed are methods, apparatuses and systems for tracking a location of a mobile device based, at least in part, on measurements over time. In response to measurements, particles in a motion model may be propagated in a first routing graph covering an area. Propagated particles may be indicative of a direction of movement along a second routing graph covering the same area or a larger area in some embodiments.

35 Claims, 9 Drawing Sheets

SYSTEM AND/OR METHOD FOR PEDESTRIAN NAVIGATION

This application claims the benefit of U.S. Provisional Patent Application 61/545,910, titled "Method and/or Apparatus for Backtracking Position Estimation," filed on Oct. 11, 2011, which is incorporated in its entirety herein by reference.

BACKGROUND

1. Field

Disclosed are methods and techniques for obtaining a position fix for a mobile device.

2. Information

Mobile devices can typically obtain a position fix by measuring ranges to three or more terrestrial transmitters (e.g., wireless access points) which are positioned at known locations. Such ranges may be measured, for example, by obtaining a MAC ID address from signals received from such access points and measuring one or more characteristics of signals received from such access points such as, for example, signal strength, round trip delay, just to name a few examples. Such measurements may be viewed as "direct measurements" in that they give information regarding a current position (such as a range to a transmitter fixed at a known location) when obtained.

Typically, measurements of ranges to only three transmitters are sufficient for obtaining a sufficiently accurate estimate of a location of the mobile device. In addition to the use of direct measurements, a mobile device may incorporate "indirect measurements" indicative of relative motion to assist in obtaining an estimate of a current position estimate. Such indirect measurements may include, for example, measurements obtained from signals generated by sensors such as, for example, accelerometers, pedometers, compasses or gyroscopes. Also, in certain environments and applications, movement of a mobile device may be constrained to predetermined areas or paths. In an indoor environment, for example, movement of a mobile device may be constrained to predetermined paths or routes defined according to walls, doorways, entrances, stairways, etc. As such, a current location of a mobile device may be presumed to be constrained by such predetermined areas or paths. However, merely constraining a mobile station's location to a path may not, without additional information, indicate a location of the mobile device with sufficient precision to useful in certain location based applications. Here, the precise location of the mobile device is still uncertain as the location may be anywhere along, or at least proximate to, any portion of a predetermined path.

BRIEF DESCRIPTION OF DRAWINGS

Non-limiting and non-exhaustive aspects are described with reference to the following figures, wherein like reference numerals refer to like parts throughout the various figures unless otherwise specified.

SUMMARY

Figure 1:
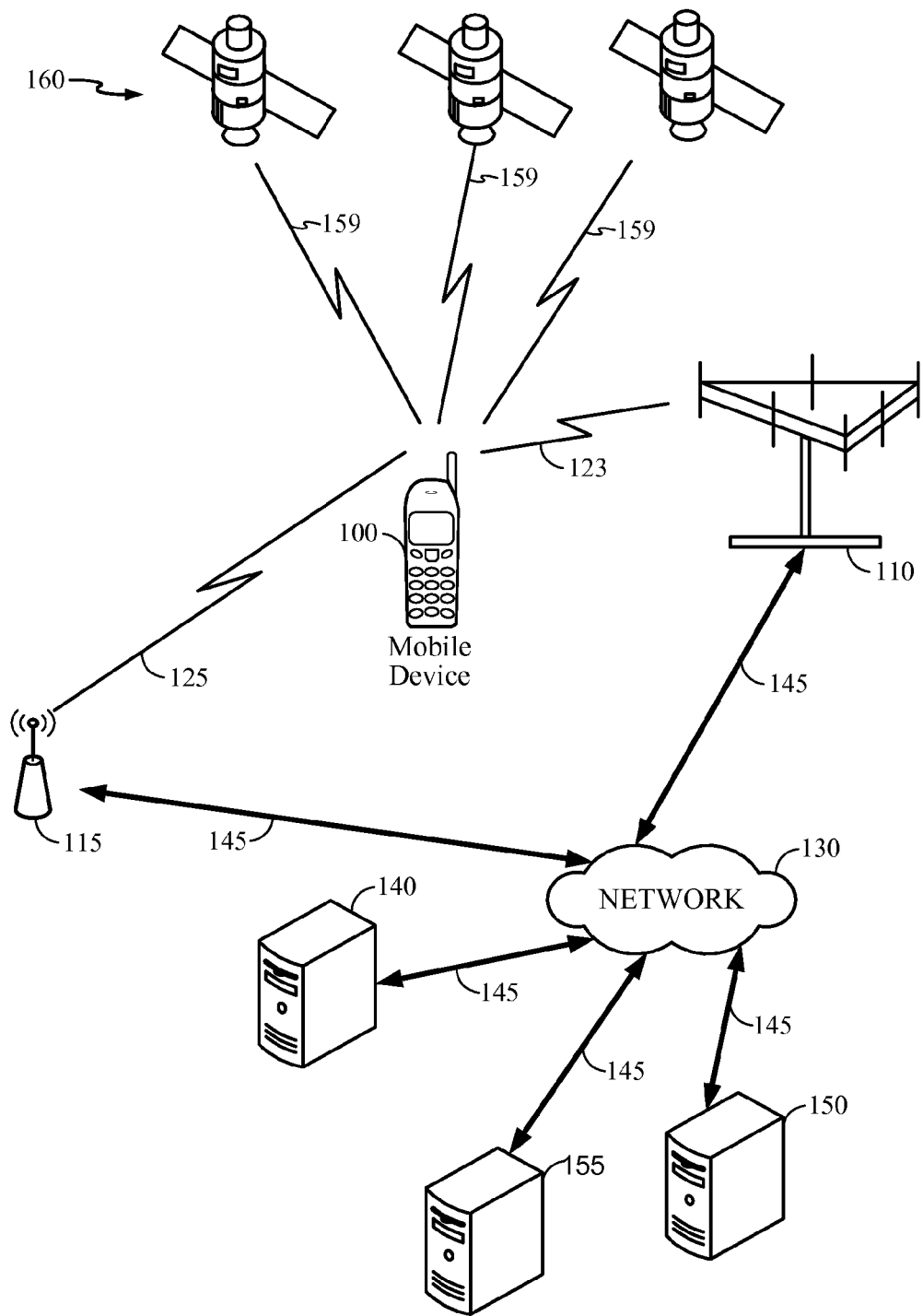
FIG. 1 is a system diagram illustrating certain features of a system containing a mobile device, in accordance with an implementation.

In one particular implementation, a method comprises: identifying particles to representing possible states of a mobile device, said possible states including at least possible locations of said mobile device in an area; determining a target anchor node of a plurality of anchor nodes in a first routing graph connecting a plurality of cells of the area based, at least in part, on measurement signals at the mobile device; and propagating one or more of said particles subject to edges of a second routing graph connecting nodes within at least one cell of the plurality of cells to represent possible movement of said mobile device based, at least in part, on the determined target anchor node.

In another implementation, a mobile device comprises: one or more inertial sensors configured to generate measurement signals; and a processor configured to: identify particles representing possible states of said mobile device, said possible states including at least possible locations of said mobile device in an area; determine a target anchor node of a plurality of anchor nodes in a first routing graph connecting a plurality of cells of the area based, at least in part, on said measurement signals; and propagate one or more of said particles subject to edges of a second routing graph connecting nodes within at least one cell of the plurality of cells to represent possible movement of said mobile device based, at least in part, on the determined target anchor node.

In another implementation, a non-transitory storage medium comprising machine-readable instructions stored thereon which are executable by a special purpose computing apparatus to: identify particles representing possible states of a mobile device, said possible states including at least possible locations of said mobile device in an area; determine a target anchor node of a plurality of anchor nodes in a first routing graph connecting a plurality of cells of the area based, at least in part, on measurement signals at the mobile device; and propagate one or more of said particles subject to edges of a second routing graph connecting nodes within at least one cell of the plurality of cells to represent possible movement of said mobile device based, at least in part, on the determined target anchor node.

In yet another implementation, an apparatus comprises: means for identifying particles representing possible states of a mobile device, said possible states including at least possible locations of said mobile device in an area; means for determining a target anchor node of a plurality of anchor nodes in a first routing graph connecting a plurality of cells of the area based, at least in part, on measurement signals at the mobile device; and means for propagating one or more of said particles subject to edges of a second routing graph connecting nodes within at least one cell of the plurality of cells to represent possible movement of said mobile device based, at least in part, on the determined target anchor node.

In an implementation, a method comprises: determining a potential direction of movement of a mobile device based on a first routing graph; and determining a position of the mobile device using one or more potential positions on a second routing graph, the one or more potential positions being based, at least in part, on the determined potential direction. In some embodiments, the second routing graph has a finer resolution than the first routing graph. In some embodiments, the second routing graph comprises a greater number of edges than the first routing graph. In some embodiments, the potential positions are represented by particles in a particle filter.

In an implementation, a method comprises: obtaining at least one measurement determined at one or more sensors associated with a mobile device; and determining a position of the mobile device based on a potential macro direction of movement of the mobile device and a plurality of potential micro directions of movement, wherein the potential macro direction of movement of the mobile device is based, at least in part, on the at least one measurement. In some embodiments, the macro direction is defined with respect to one of a plurality of areas adjacent to a previous position of the mobile device. In some such embodiments, the previous position is located in an area where there is an opportunity for change of direction.

It should be understood, however, that the aforementioned implementations are merely particular example implementations, and that claimed subject matter is not limited to these particular example implementations.

DETAILED DESCRIPTION

In particular implementation, a mobile device may employ a motion model such as a particle-filter to incorporate direct and indirect measurements to estimate a motion state of the mobile device over a constrained routing graph. In example implementations, a particle may represent a possible motion state including at least a location on a routing graph. Other attributes of a possible motion state may include, for example, velocity or acceleration along a routing graph.

In a particular implementation, a mobile station may employ a particle-filter according to a constrained routing graph to incorporate direct and indirect measurements subject to route constraints as follows:
1) particles may be propagated along a routing graph according to the particle state, and the indirect information about relative position movement.
2) each particle is assigned a likelihood according to direct measurements.
3) particles may then be resampled according to the likelihood distribution.

Depending on a complexity of a constrained routing graph implemented in a motion model such as a particle filter, implementation of the motion model on a mobile computing device may entail use of significant processing resources (e.g., memory and CPU resources).

In a particular implementation, a motion model may apply direct or indirect measurements to propagate particles representing possible motion states including location along multiple routing graphs. A navigable area may be partitioned in to "cells" (e.g., rooms or hallways connecting rooms) and a coarse routing graph may define feasible movements or transitions between the cells. Indirect and direct measurements may be incorporated to propagate particles representing possible motion states of a tracked object along edges of the coarse routing graph to, for example, estimate or predict movements of the tracked object between or among cells. In addition, indirect and direct measurements may be incorporated to propagate particles along a fine routing graph representing possible motion states local to a current cell. By limiting propagation of particles over a fine routing graph over a smaller, local routing graph, instead of over a larger indoor area, processing resources may be conserved. Further, motion of a user modeled using the particle filter may be more realistic and/or more accurate. In some embodiments, such increased realism and/or accuracy may be achieved using fewer particles in the particle filter. Moreover, enhancements to a particle filter motion model described herein may significantly improve performance in that a given level of estimation accuracy may be achieved with fewer particles (e.g., compared to a random walk or memoryless directed random walk).

Certain embodiments of known particle filters tracking a mobile device over a routing graph connecting densely populated grid points may lead to local inferences of movement that are made independently of a context of where a pedestrian is predisposed to travel. This may diminish a macro context of tracking pedestrian movements to destinations in an indoor area. In addition, large rooms with small exits may create "trapping areas" where a particle may be impeded from escaping despite movement. However, in a particular implementation according to embodiments herein, a likely direction of pedestrian movement may be used to affect direction of movement of particles to avoid one or more of the aspects discussed above. In this way, decisions regarding pedestrian movement may be made over longer, more natural stretches. Similarly, a more natural model of pedestrian mobility may be enforced or applied over the routing graph connecting densely populated grid points.

In certain implementations, as shown in FIG. 1, a mobile device 100 may receive or acquire SPS signals 159 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, WAAS, EGNOS, QZSS, just to name a few examples.

In addition, the mobile device 100 may transmit radio signals to, and receive radio signals from, a wireless communication network. In one example, mobile device may communicate with a cellular communication network by transmitting wireless signals to, or receiving wireless signals from, a base station transceiver 110 over a wireless communication link 123. Similarly, mobile device 100 may transmit wireless signals to, or receiving wireless signals from a local transceiver 115 over a wireless communication link 125.

In a particular implementation, local transceiver 115 may be configured to communicate with mobile device 100 at a shorter range over wireless communication link 125 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, base station transceiver 110 and local transceiver 115 may communicate with servers 140, 150 and 155 over a network 130 through links 145. Here, network 130 may comprise any combination of wired or wireless links. In a particular implementation, network 130 may comprise Internet Protocol (IP) infrastructure capable of facilitating communication between mobile device 100 and servers 140, 150 or 155 through local transceiver 115. In another implementation, network 130 may comprise cellular communication network infrastructure such as, for example, a base station controller or master switching center to facilitate mobile cellular communication with mobile device 100.

In particular implementations, and as discussed below, mobile device 100 may have circuitry and processing resources capable of computing a position fix or estimated location of mobile device 100. For example, mobile device 100 may compute a position fix based, at least in part, on pseudorange measurements to four or more SPS satellites 160. Here, mobile device 100 may compute such pseudorange measurements based, at least in part, on of pseudonoise code phase detections in SPS signals 159 acquired from four or more SPS satellites 160. In particular implementations, mobile device 100 may receive from server 140, 150 or 155 positioning assistance data to aid in the acquisition of SPS signals 159 transmitted by SPS satellites 160 including, for example, almanac, ephemeris data, Doppler search windows, just to name a few examples.

In other implementations, mobile device 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from mobile device 100 may be measured to three or more of such terrestrial transmitters fixed at known locations based, at least in part, on pilot signals transmitted by the transmitters fixed at known locations and received at mobile device 100. Here, servers 140, 150 or 155 may be capable of providing positioning assistance data to mobile device 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions.

In particular environments such as indoor environments or urban canyons, mobile device 100 may not be capable of acquiring signals 159 from a sufficient number of SPS satellites 160 or perform AFLT or OTDOA to compute a position fix. Alternatively, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT). In alternative implementations, mobile device 100 may obtain an indoor position fix by applying characteristics of acquired signals to a radio "heatmap" indicating expected RSSI and/or RTT signatures at particular locations in an indoor area.

In particular implementations, mobile device 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, locations and identities of transmitters, routeability graphs, just to name a few examples. Other assistance data received by the mobile device may include, for example, local maps of indoor areas for display or to aid in navigation. Such a map may be provided to mobile device 100 as mobile device 100 enters a particular indoor area. Such a map may show indoor features such as doors, hallways, entry ways, walls, etc., points of interest such as bathrooms, pay phones, room names, stores, etc. By obtaining and displaying such a map, a mobile device may overlay a current location of the mobile device (and user) over the displayed map to provide the user with additional context.

In one implementation, a routeability graph and/or digital map may assist mobile device 100 in defining feasible areas for navigation within an indoor area and subject to physical obstructions (e.g., walls) and passage ways (e.g., doorways in walls). Here, by defining feasible areas for navigation, mobile device 100 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular embodiment, mobile device 100 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of mobile device 100.

According to an embodiment, mobile device 100 may access indoor navigation assistance data through servers 140, 150 or 155 by, for example, requesting the indoor navigation assistance data through selection of a universal resource locator (URL). In particular implementations, servers 140, 150 or 155 may be capable of providing indoor navigation assistance data to cover many different indoor areas including, for example, floors of buildings, wings of hospitals, terminals at an airport, portions of a university campus, areas of a large shopping mall, just to name a few examples. Also, memory resources at mobile device 100 and data transmission resources may make receipt of indoor navigation assistance data for all areas served by servers 140, 150 or 155 impractical or infeasible, a request for indoor navigation assistance data from mobile device 100 may indicate a rough or course estimate of a location of mobile device 100. Mobile device 100 may then be provided indoor navigation assistance data covering areas including and/or proximate to the rough or course estimate of the location of mobile device 100.

In one particular implementation, a request for indoor navigation assistance data from mobile device 100 may specify a location context identifier (LCI). Such an LCI may be associated with a locally defined area such as, for example, a particular floor of a building or other indoor area which is not mapped according to a global coordinate system. In one example server architecture, upon entry of an area, mobile device 100 may request a first server, such as server 140, to provide one or more LCIs covering the area or adjacent areas. Here, the request from the mobile device 100 may include a rough location of mobile device 100 such that the requested server may associate the rough location with areas covered by known LCIs, and then transmit those LCIs to mobile device 100. Mobile device 100 may then use the received LCIs in subsequent messages with a different server, such as server 150, for obtaining navigation assistance relevant to an area identifiable by one or more of the LCIs as discussed above (e.g., digital maps, locations and identifies of beacon transmitters, radio heatmaps or routeability graphs).

Figure 2:
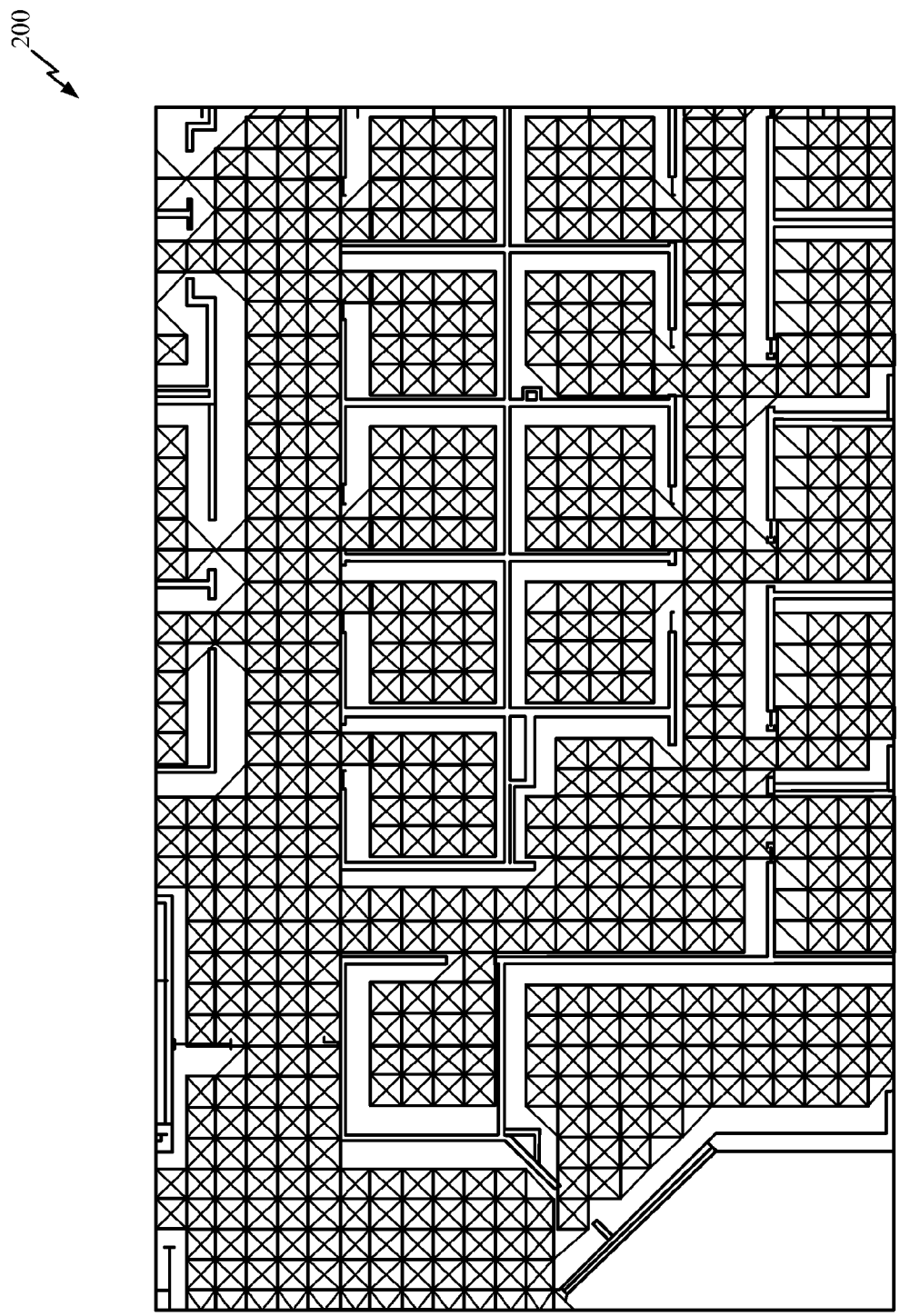
FIG. 2 is a map of a portion of an indoor area including a connectivity graph connecting grid points according to an implementation.

FIG. 2 is a map of a portion 200 of an indoor area including a connectivity graph connecting grid points according to an implementation. Segments of the connectivity graph illustrating paths between defined portions of the indoor area may form a routing graph. The map shown in FIG. 2 may be represented or maintained in a digital format as an electronic or "digital" map that is stored in a memory device of a mobile device such as mobile device 100. The connectivity graph shown comprises edges connecting grid points to represent possible transitions between grid points. In the particular implementation shown in FIG. 2, grid points are placed in a regular square pattern at a set spacing (e.g., 2.0 feet by 2.0 feet). Accordingly, a grid point may be connected to as many as eight neighboring grid points by edges in the routing graph. Probabilities of transitioning from a grid point to a neighboring grid point along a connecting edge may be initially established according to a "probability heatmap."

As pointed out above, while application of a particle filter to a routing graph connecting more densely populated grid points over a given area (e.g., as shown in FIG. 2) may allow for an accurate or precise estimate or prediction of a motion state, such an application of a particle filter over a dense population of grid points is computationally intensive. As explained above, a particle may represent a possible state of a mobile device (e.g., location, velocity, etc.). In a particular implementation, a motion model may propagate particles over a first routing graph connecting a dense population of grid points in an indoor area. A direction of movement along a second coarse routing graph connecting a more sparse population of nodes over the indoor area may be determined or selected, for example based on a determined or selected target area or location. As explained below with particular examples, a particular motion model may propagate a particle along the first routing graph to model likely movement of a mobile device in a short-term. The determined or selected direction of movement along the second routing graph may be used model likely movement of the mobile device over a longer-term, and may be applied to affect particles which are propagated on the first routing graph. A motion model may assign high-level motion destination cells based on the coarse routing graph while movements within each cell may be modeled on the denser routing graph. The likelihoods of such movements with the cell may be affected by or based on the high-level motion destination cell(s). Such a motion model may benefit both from the finer resolution of movements modeled on the dense graph while preserving the purposeful property of normal pedestrian motion. In other words, the coarse routing graph may model a pedestrian's purposeful movements toward a destination such as along a hallway travelling between rooms in an indoor environment while the denser routing graph may model finer or smaller movements that may deviate somewhat from a path toward the destination. Thus, in some embodiments, a particle may not be propagated along edges of the coarse routing graph, but rather the coarse routing graph may influence propagation of the particle along the dense routing graph.

Figure 3A:
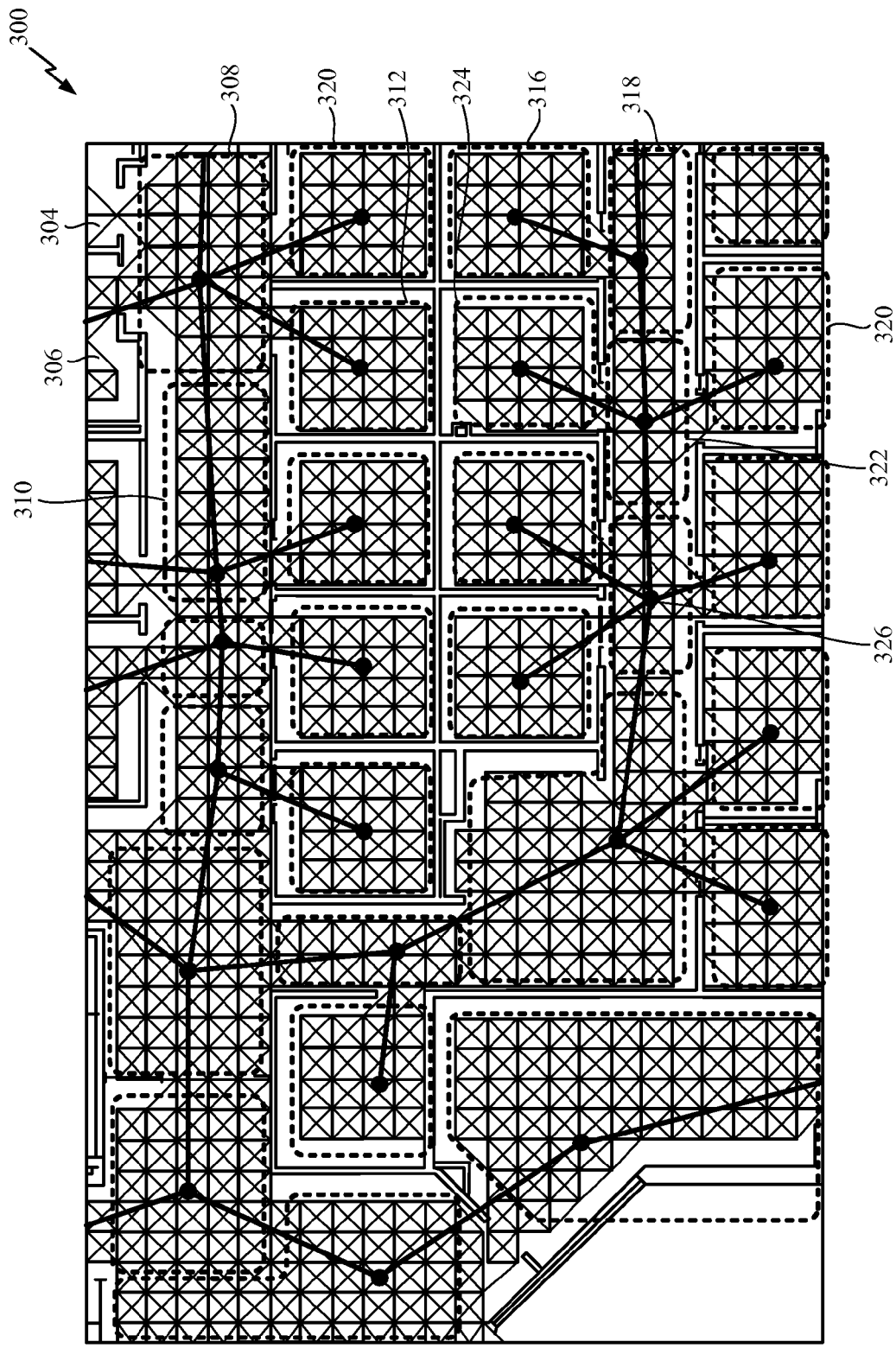
FIG. 3A is a map of a portion of an indoor area partitioned into cells connected by a routing graph according to an implementation.

FIG. 3A is a map of a portion 300 of an indoor area including a first routing graph comprising edges connecting a dense population of grid points (e.g., as shown in FIG. 2) and a second routing graph connecting zones within the indoor area. Here, the indoor area shown in FIG. 3A is partitioned into "cells" defining areas within which a mobile device or user co-located with a mobile device may travel in many different directions as indicated by an estimated or predicted motion state. Also, a cell may comprise an area covered by a room or portion of a hallway connecting rooms, etc. Alternatively, a cell may define any portion of a navigable area that may be a destination for a pedestrian which is distinct from other cells. While cells depicted in FIG. 3A are shown by broken lines as non-overlapping, cells may be overlapping in other implementations. Also, the particular implementation of FIG. 3A shows that cells are touching and that there are essentially no gaps in the indoor that are not included in a cell. In other embodiments, such gaps in coverage between cells may exist. In any case, these are merely examples of how a cell may be characterized according to a particular implementation and claimed subject matter is not limited in this respect. According to an embodiment, cells in an indoor area may be defined by visual inspection. In other embodiments, cells may be automatically defined by a computing apparatus from features extracted from a CAD map or other type of electronic map of the indoor area, or may be inferred or determined from a connectivity or routing graph.

As shown, the second routing graph connects nodes assigned to cells as "anchor nodes" to reflect movement or traveling between cells. Here, anchor nodes may reflect any number of aspects of pedestrian movement along the coarse routing graph. For example, an anchor node may be placed at the center of a cell to define a single-point destination of a pedestrian toward the cell. An anchor node may also define a single-point junction between edges in the coarse routing graph to indicate a possible change of direction of a pedestrian from a direction along one edge to another. It should be understood, however, that these are merely examples of how an anchor node on a coarse routing graph may be applied in a particular implementation, and claimed subject matter is not limited in this respect.

In one implementation, the second routing graph may comprise a "reduced" routing graph based on or including a subset of nodes and edges from the first routing graph (e.g., connecting dense grid points). Here, grid points may be represented as entries in a data structure stored in a memory including locations of the grid points and an indication of neighboring grid points that are connected by an edge in a dense routing graph. In implementing a reduced routing graph, reduced nodes may be identified along with a list of neighboring nodes. A cell may be described, at least in part, by associating locations of grid points connecting edges in the first routing graph with the cell in table indexed by a reduced node in the reduced routing graph that absorbs the grid points. In another implementation, the second routing graph may represent possible movement for a significant change of direction or location of a mobile device travelling in the indoor area. While edges of the second routing graph may be formed from edges and nodes in a first routing graph connecting dense grid points, in particular implementations the second routing graph may be formed from edges that do not overlap edges of the first routing graph. In one example implementation, the second routing graph may efficiently be applied to estimating or predicting long or medium term movement between cells (e.g., rooms) while the first routing graph may be applied to estimating or predicting a motion state pertaining to smaller movements within a cell with a high degree of precision. In a particular implementation, a motion model may apply a first probability heatmap expressing transition probabilities between nodes in the first routing graph to propagate particles representing possible motion states along edges of the first routing graph in response to direct and indirect measurements to estimate or predict a motion state within a cell. In a particular implementation, a motion model may also infer a likely direction of movement toward nodes in the second routing graph (e.g., an anchor node of a selected "target cell" as discussed below) to express likelihoods of transition based, at least in part, on particles propagated along the first routing graph. In one example implementation, particles representing possible motion states propagated along edges of the first routing graph may indicate a direction of movement along the second routing graph including, for example, turn decisions to be made at a node in the second routing graph (e.g., at a node where there is an opportunity for turning to a room from a hallway or at an intersection of hallways). Such direction of movement along the second routing graph may be used to affect further movement or likelihood of movement of particles along the first routing graph.

Portion 300 of a map of an indoor area shows a subdivision into cells including cells 304, 306, 308, 310, 312, 316, 318, 322 and 324. A routing graph (e.g. second routing graph as discussed above) connects anchor nodes located in corresponding cells. As illustrated, this routing graph connects cells to specify feasible movement between neighboring or adjacent cells. For example, a mobile device located in cell 322 may travel directly into adjacent or neighboring cells 326, 320, 318 or 324 along a routing graph connecting anchor nodes in these cells. Cells having only a single neighboring or adjacent cell, and connected to remaining cells through the single neighboring or adjacent cell, may be identified as "leaf" cells. In a particular implementation, a motion state (e.g., including a direction of movement and speed) of an object being tracked may be transitioned between anchor nodes of neighboring or adjacent cells along the routing graph connecting the anchor nodes. In an example implementation, a motion model for a trajectory estimation system such as a particle filter may apply particles propagated to represent motion states along edges of a dense routing graph, assisted by inferences of movement along edges of the coarse routing graph, for determining a speed and a direction of movement. A particular filter may apply these propagated particles for determining a direction and estimating a speed based, at least in part, on a probability heat map setting forth likelihoods of transitioning between nodes on the dense routing graph.

Figure 3B:
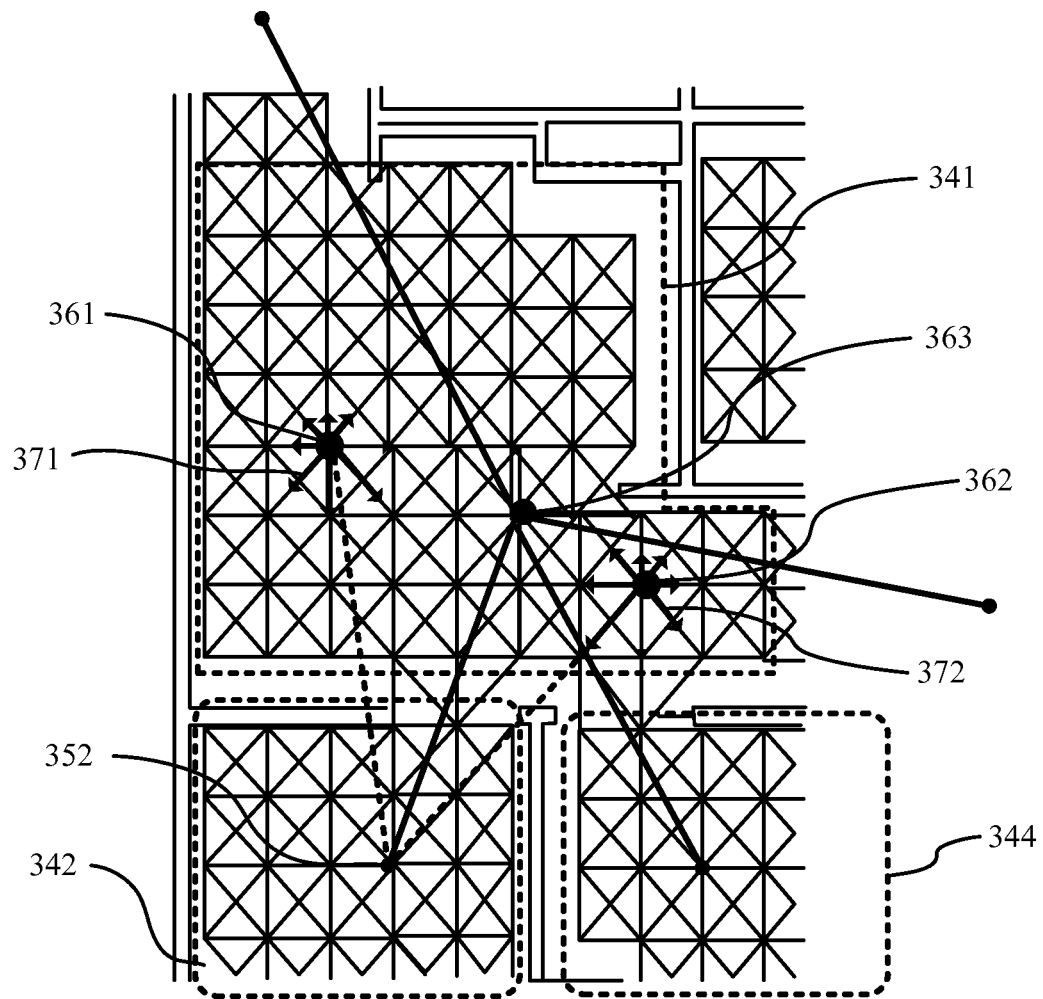
FIG. 3B is a map of a portion of an indoor area illustrating aspects of a motion model according to an implementation.

FIG. 3B is a map of an indoor area illustrating aspects of a motion model according to an implementation. For example, FIG. 3B may illustrate a close up or zoomed in view of a section of the portion 300 or another portion or area. Here, particles 361 and 362 are located in a current cell 341. Anchor node 363 is an anchor node of current cell 341 and anchor node 352 is an anchor node of cell 342. For any particular particle, a target cell may be selected from among cells 342 and 344, among others, that are neighboring current cell 341. In the currently illustrated example, cell 342 is selected as the target cell for particles 361 and 362. As discussed below, a target cell may be selected based, at least in part, on a most likely direction of movement from an anchor cell associated with a current cell. In one implementation, a target cell may be selected for a single particle indicative of location in the current cell to indicate possible or likely motion. Alternatively, target cells may be selected for multiple particles or all particles within a current cell.

In some implementations, a target cell may be selected based on a likely direction of movement, for example according to a motion model and/or measurements collected at a mobile device. In such embodiments, the motion model may include past particle locations or other forms of particle filter history. A potential cell toward which the mobile device is likely headed may therefore be selected as the target cell, for example based on measurements at the mobile device and/or past or current movement. In some embodiments, a target cell may be selected based on crowdsourced data. For example, when a user is located at an anchor node or location where the user may choose one of several paths, a likely path and target cell may be selected based on a percentage of times that other users select each path. In some embodiments, a target cell may be based on a determined or predicted utility of that cell to the user, and/or based on points of interest located within the cell and/or within other potential cells or along paths that may travel through the cell or other potential cells. In some embodiments, a target cell is randomly chosen from all adjacent cells which a user may enter whenever a user reaches a location where a decision between such adjacent cells is possible. In other embodiments, another technique or factor may be used when choosing or selecting a target cell. In other implementations, a target cell may be selected based, at least in part, on particular attributes of a user of a mobile device if the attributes indicate a propensity for the user to enter one cell versus another cell. For example, in a floor of an office building a user may have is desk in and, primarily work and reside in a particular office (a first cell) along a hallway. As such, if the use is tracked along a routing graph in the hallway, the target cell may be more likely to be selected as the user's office rather than a storage closet (second cell) that is also connected to the hallway. This may be implemented by weighting a path to the office more heavily in a maximum likelihood predictor of the user's path. It should be understood, however, that these are merely examples of how a target cell may be selected and claimed subject matter is not limited in this respect.

Figure 7:
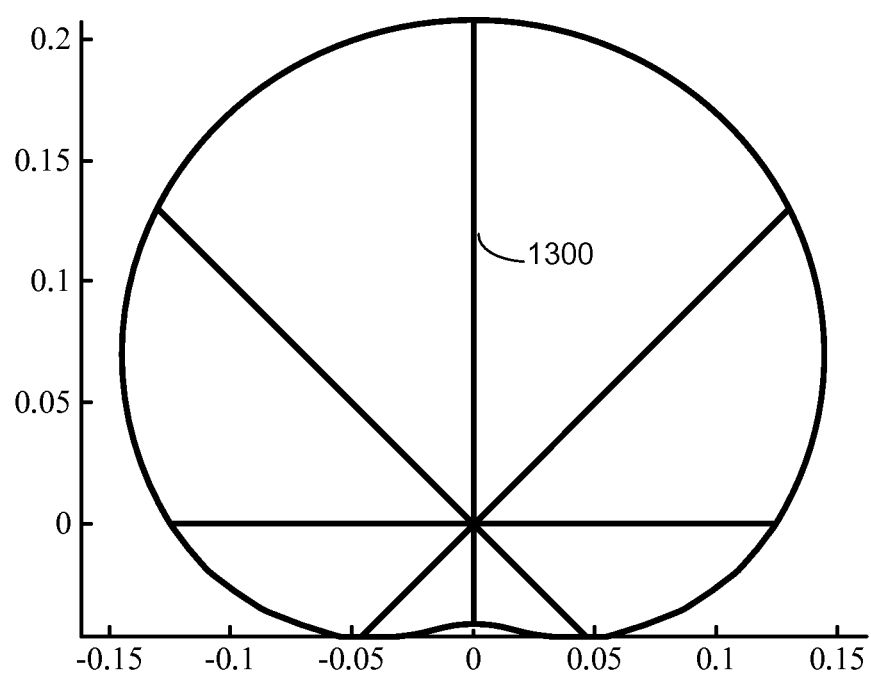
FIG. 7 is a plot of an example of a distribution of transition likelihoods along edges according to an implementation.

Dashed lines are illustrated in FIG. 3B as extending from particles 361 and 362 toward anchor node 352 of cell 342, which cell 342 has been selected as the target cell for particles 361 and 362 in this example. In some embodiments, a probability distribution describing potential movement of a particle may be defined such that the particle is more likely to travel roughly or substantially toward the anchor point of the target cell, for example along a path nearest to the illustrated dashed lines. For example, an amplitude or magnitude (e.g., represented as relative length in FIG. 3B) of arrows 371 illustrated in FIG. 3B as extending from anchor node 363 and arrows 372 illustrated in FIG. 3B as extending from anchor node 362 node may represent likelihoods of direction of movement in a subsequent processing cycle. For example, the larger arrow of arrows 371 extending directly downward from particle 361 may indicate that particle 361 is more likely to move directly downward toward target anchor node 352. Similarly, the larger arrow of arrows 372 extending "southwestward" may indicate that particle 362 is more likely to move diagonally toward target anchor node 352. In a particular implementation, a distribution of magnitudes of arrows 371 and 372 (representing likelihoods of direction of movement), may be as shown in the plot of FIG. 7 showing a highest weighting in a direction toward an anchor node of a target cell with a decreasing weight moving off axis of the direction toward the target cell. As such, although it is possible for particles 361 or 362 to take a random trajectory along any edge to which it is connected, movement toward cell 342 is the most likely movement, consistent with the fact that cell 342 is the selected target cell for both particle 361 and particle 362.

In some embodiments, the likelihoods represented by the arrows 371 and 372 may be determined by applying a distribution of transition likelihoods in a direction of the target cell. For example, FIG. 7 illustrates a plot of an example of a distribution of transition likelihoods along edges according to an implementation. In a particular implementation, a distribution of magnitudes of arrows 371 and 372 (representing likelihoods of direction of movement), may be as shown in the plot of FIG. 7 showing a highest weighting in a direction toward an anchor node of a target cell with a decreasing weight moving off axis of the direction toward the target cell. In FIG. 7, segment 1300 pointing straight up may be used to represent a likelihood of transitioning in a direction toward the target node, for example along the dotted line. If segment 1300 is aligned with the dotted line or aligned with the edge of the fine routing graph that is nearest the dotted line, segment 1300 may represent a likelihood of transitioning along that edge while the other arrows represent the likelihoods of transitioning along the other adjacent edges. Similarly, such a distribution may be projected onto the edges surrounding a particular node at which a particle is located based on the direction of the target cell. In some embodiments, each edge adjacent to a node at which a particle is located may be assigned a likelihood of transition within a certain range of probabilities, wherein the range for each edge is based on a relative disposition of the edge relative to the direction of the target cell. In such embodiments, likelihoods of transition for each edge may be randomly selected from the ranges. In some embodiments, the likelihood of transitioning along each edge adjacent to a node at which a particle is located may be randomly assigned without reference to or influence by other factors. In other embodiments, another technique or factor may be used when assigning likelihoods of transition.

As can be observed from FIG. 3B, if cell 342 is a target cell, dashed lines between anchor node 352 of target cell 342 and particle 361 may indicate a direction of likely movement from particle 361 toward target cell 342. Accordingly, the magnitude of arrows 371 extending from particle 361 may be weighted more heavily toward anchor node 352 according to the dashed line, for example according to one or more methods described above. Similarly, dashed lines between anchor node 352 of target cell 342 and particle 362 may indicate a direction of likely movement from particle 362 toward target cell 342. Here, the magnitude of arrows 372 extending from particle 362 may be weighted more heavily in a direction toward anchor node 352, for example according to one or more methods described above. The method or technique used for assigning transition likelihoods may be the same for particles 361 and 362, or may differ.

If particle 361 actually enters cell 342, a new target cell (e.g., a cell below cell 342, not shown) may be selected for particle 361 while cell 342 becomes a new current cell. Alternatively, previous current cell, cell 341, may also become the new target cell. In either case, in a particular implementation, as particle 361 transitions from cell 341 to cell 342, a "wandering" timer may be set. Here, if cell 341 is then selected as the target cell of particle 361, particle 361 may be prevented from returning to cell 341 until the wandering timer expires, thereby enforcing that particle 361 dwells for a minimum duration in cell 342 before returning to cell 341. Application of the wandering timer may be particularly useful if a particle enters a leaf cell. After expiration of a wandering timer, a likely direction of movement of a particle toward a new target cell may be selected as discussed above.

In another particular example, if particle 362 moves directly downward over two cycles, it may enter cell 344 and not cell 342 determined to be the target cell. Here, to redirect particle 362 toward target cell 342, cell 341 may be selected as a new target cell. By setting the wandering timer to zero, particle 362 may be made or influenced to return immediately. As particle 362 transitions to cell 341, a new direction may be selected for particle 362 (e.g., a most likely direction of movement as discussed above) toward a new target. This new target cell may be different from the direction that (incorrectly) directed particle 362 to cell 344 in some embodiments.

Figure 4A:
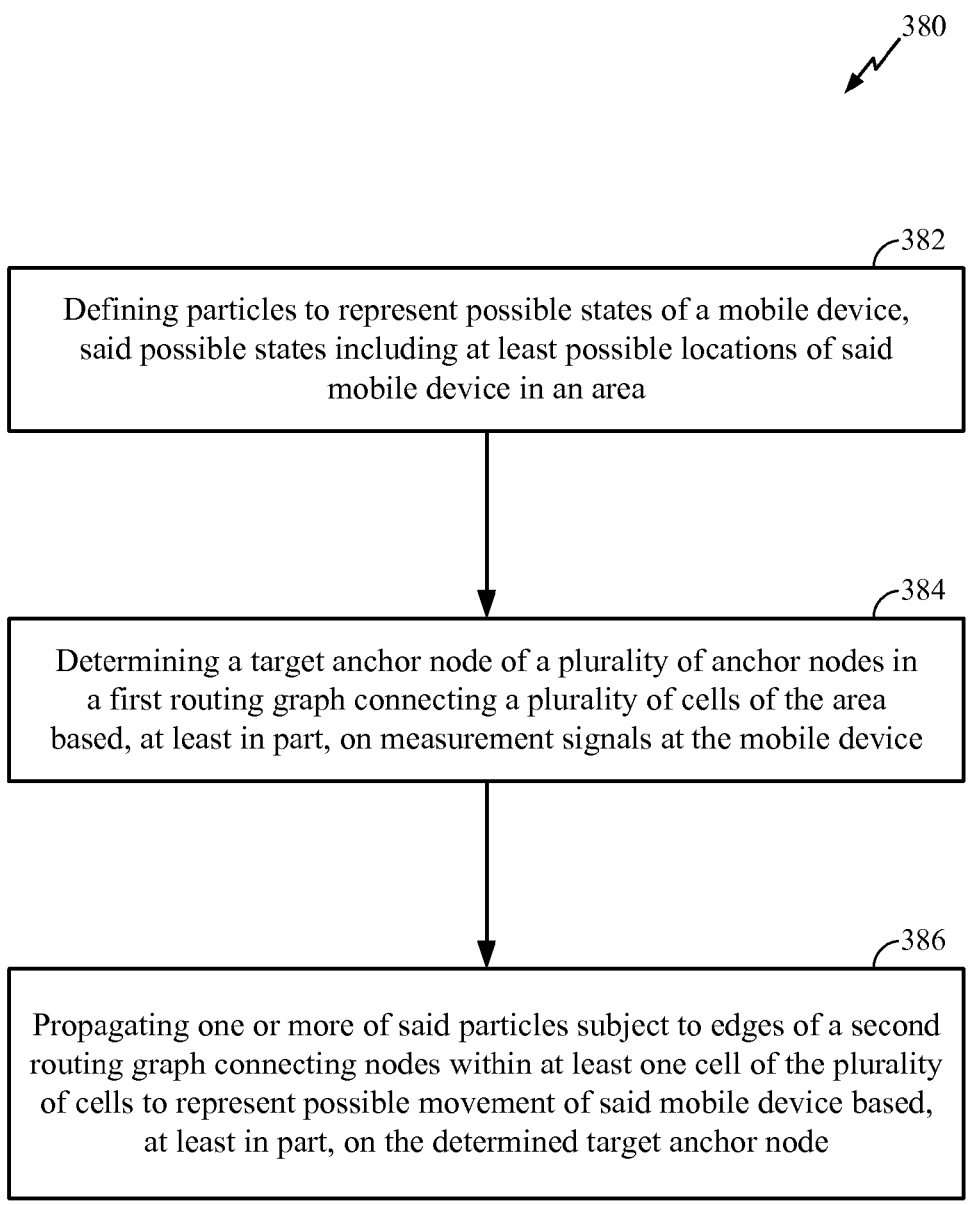
FIG. 4A is a flow diagram illustrating a process to track a location of a mobile device according to an embodiment.

FIG. 4A is a flow diagram illustrating a process 380, which may for example be used to track a motion state of a mobile device according to an embodiment. Block 382 may identify particles representing possible states of a mobile device. The possible states may include at least possible locations of the mobile device in an area. Block 384 may determine a target anchor node of a plurality of anchor nodes in a first routing graph connecting a plurality of cells of the area based, at least in part, on measurement signals. Block 386 may propagate one or more of the particles subject to edges of a second routing graph connecting nodes within at least one cell of the plurality of cells to represent possible movement of the mobile device based, at least in part, on the determined target anchor node.

Figure 4B:
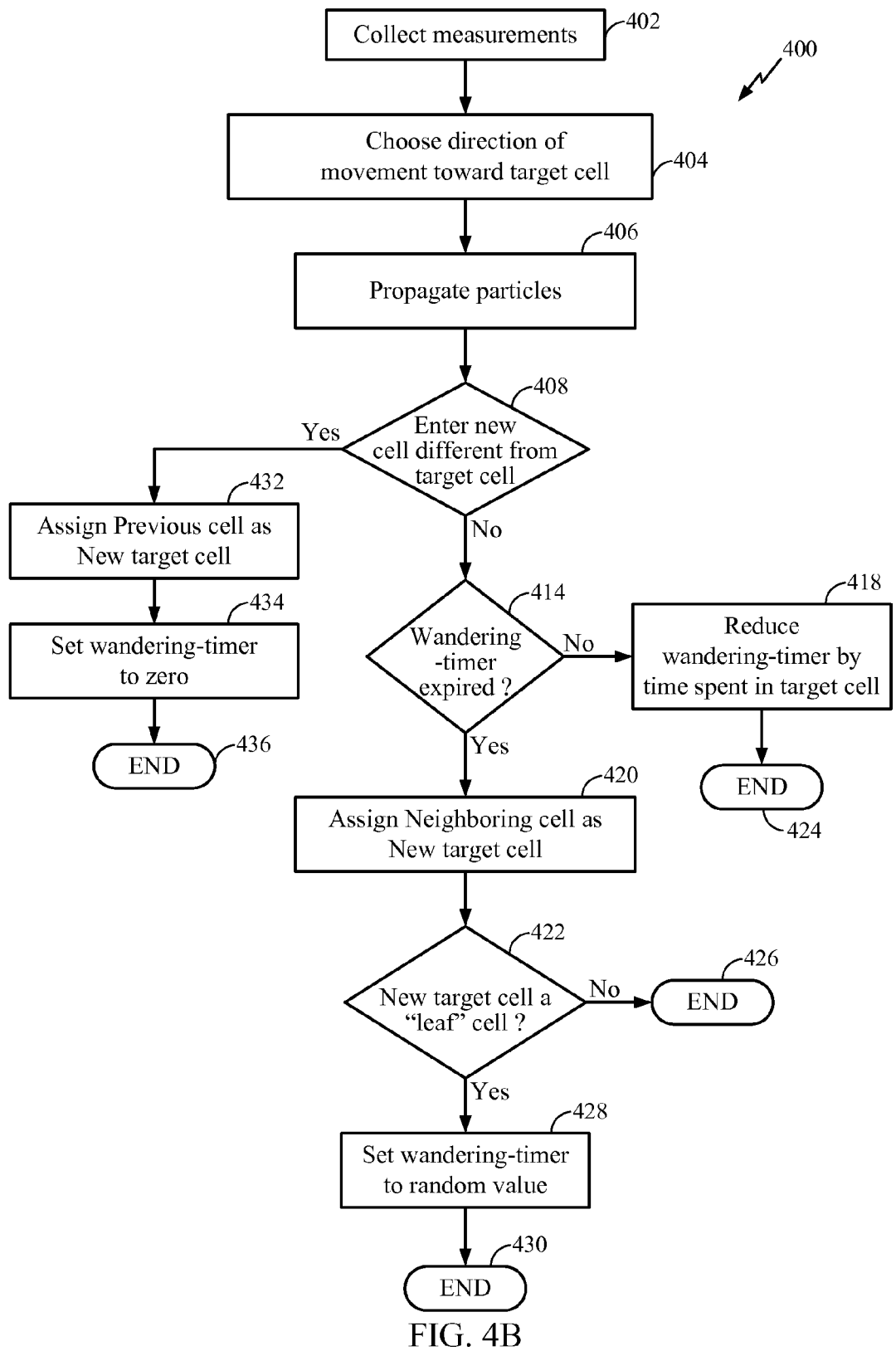
FIG. 4B is a flow diagram illustrating a process to track a location of a mobile device according to an implementation.

FIG. 4B is a flow diagram illustrating a process 400 to track a motion state of a mobile device between or among cells according to a particular implementation. For example, process 400 may be directed to determining a target cell on processing intervals. As indicated above, a motion state of a mobile device may specify or indicate a location of the mobile device in a particular current cell in a portion of an indoor area (e.g., as shown in FIG. 3). Based, at least in part, on indirect or direct measurements, an estimated or predicted motion state may indicate that the mobile device is moving toward a "target" cell. Similarly, a motion model may transition or propagate a particle representing a state of a mobile device indicating movement of the mobile device toward a target cell. Here, such a target cell may comprise a cell that is neighboring or adjacent to the current cell. In a particular implementation, a motion state indicating a location, heading, speed and/or acceleration may be indicative of movement from a current cell toward or imminently into a target cell. The target cell may be randomly selected by a motion model according to an expected likelihood of movement to each neighboring cell, and may be recorded as part of a latent motion state determining a possible medium-term movement pattern. For example, an adjacent cell may be selected as the target cell if the likelihood of transitioning to the adjacent cell is higher than the likelihood of transitioning to any other adjacent cell.

At block 402, direct and/or indirect measurements indicative of a motion state of a mobile device may be collected from any one of several sources as discussed above and time referenced. In some embodiments, these measurements may be considered in combination with prior particle movement or other form of particle filter history at block 404 to determine, select, or choose a target cell and/or a potential direction of movement toward the target cell.

As pointed out above, an estimated or likely motion state of a mobile device may be determined according to the motion model to specify, for example, a location of a mobile device on an edge of the routing graph and a velocity of the mobile device along the edge. Here, such an estimated or likely motion state of a mobile device may be determined based, at least in part, on particles propagated according to the motion model. In a particular implementation, the estimated velocity along an edge of a routing graph may indicate movement toward a neighboring or adjacent cell as a target cell (e.g., as illustrated at block 404). For example, particles propagated along edges of a dense routing graph may be indicative of a direction and/or speed of movement along edges of a coarse routing graph connecting adjacent cells. As pointed out above in FIG. 3B, movement along an edge of a coarse routing graph may indicate movement toward an adjacent cell to be selected as a target cell. For example, in a particular implementation, a maximum likelihood estimator may select a particular adjacent cell (e.g., from among multiple adjacent cells) as a target cell based, at least in part, on an estimated direction of movement along the coarse routing graph. Other techniques for selecting or determining cell, for example based on one or more collected measurements and/or as discussed above, may be used to choose the direction of movement at block 404. In some embodiments, block 384 illustrated in FIG. 4A may comprise block 402 and/or block 404.

At block 406, one or more particles may be propagated, for example based on the direction chosen at block 404. As discussed above, the likelihood of a particle being propagated in any given direction may be determined based on a direction toward a target anchor node, for example such that transgression towards the cell in which the target anchor node is located is more likely. As further discussed above, such likelihoods may be chosen or assigned in any number of ways. For example, a probability distribution may be applied to edges of a fine routing graph based on the direction chosen in block 404, or likelihoods may be randomly chosen from potential ranges based on the direction chosen at block 404. Other techniques for determining the likelihoods may be used in some embodiments.

In some embodiments, a motion model (such as one applied in a particle filter) may incorporate measurements collected at block 402 to affect possible motion states along edges of a routing graph connecting anchor nodes in respective cells. In this context, particles may be indicated as having a "location" representing a possible location of a mobile device that may move on iterations to propagate the particles in response to measurements. As such, a particle located in one cell may "move" to an adjacent cell on a propagation interval. In particular implementations, a motion model such as one applied in a particle filter, may predict the movements of particles representing possible states of the mobile device. A particle may represent these possible states of the mobile device as a motion state vector including a location of the mobile device, direction of movement and/or speed of movement. On propagation iterations, a "location" of a particle (e.g., possible location of a mobile device indicated in a motion state vector) may be moved along edges of a dense routing graph to represent short-term changes in location and movement. These short-term changes in location and movement may be determined by taking into consideration the medium term movements between cells based on a coarse routing graph, for example as described above. In some embodiments, block 386 illustrated in FIG. 4A may comprise block 406 and/or any subsequent block in FIG. 4B.

In a particular implementation, a motion model may apply a "wandering timer" to model a duration of time that a mobile device or particle representing a state of the mobile device wanders within a "current cell" before progressing to a target cell. A target cell may comprise a cell that is neighboring or adjacent to a cell where a particle is currently located ("current cell"). As indicated above, a target cell may be determined or selected based, at least in part, on an indication of a likelihood of a particle transitioning from the current cell to the adjacent target cell. Based, at least in part, on an estimated velocity of the mobile device along an edge in a coarse routing graph, block 406 may infer or predict movement of the mobile device toward or away from the target cell. On propagation iterations, a motion model may select a likely direction for movement of each particle on the dense routing graph toward an anchor node of that particle's target cell. This likely direction may be selected based, at least in part, on a prior likelihood of changes in direction of a particle on the dense routing graph, a probability heatmap representing likelihoods of movement toward dense grid points, and a prior direction of movement of that particle. Thus a particle representing a possible state of the mobile device may arbitrarily change direction along the dense routing graph. For example, a location of a particle representing a possible state of the mobile device may, in fact, enter a cell that is not its selected target cell. Referring to the example implementation of FIG. 3A, a particle located in cell 322 may represent a possible motion state indicating an estimated velocity along a coarse routing graph suggesting that the mobile device is moving toward cell 318. However, the particle may instead change direction and actually enter cell 324, 320 or 326.

It is determined at diamond 408 whether the particle enters the target cell selected at block 404 or a different neighboring cell. If, responsive to a random nature of a motion model, a particle representing a possible state of a mobile device actually enters a neighboring cell that is not a selected target cell, block 432 may assign a new target cell as the previous cell. A wandering-timer for that particular particle may also be set to zero at block 434 so that the particle may return to the previous cell without delay.

If a particle is propagated to a current cell that is a selected target cell, it may be determined at diamond 414 whether the wandering time has expired, and if so, a neighboring cell may be selected as a new target cell at block 420, based at least in part on a predefined likelihood of movement to that neighboring cell from the current cell. Otherwise, if the wandering timer has not expired, the wandering-timer may be reduced at block 418 by time spent in the target cell and process 400 terminates at 424. In some embodiments, the process 400 continues to diamond 414 from diamond 408 if the particle has been propagated to another node within the same cell. If a new target cell determined at block 420 is a leaf cell (e.g., has only one adjacent or neighboring cell) as determined at diamond 422, the wandering-time is set to a random value at block 428 and process 400 terminates at 430. It should be understood, however, that this is merely an example of how a wander timer may be set if a leaf cell is detected as a target cell, and claimed subject matter is not limited in this respect.

It will be appreciated that many advantages and/or efficiencies may be achieved pursuant to embodiments herein. For example, the coarse routing graph may be used to determine longer-term destinations for particles in a particle filter, and the fine routing graph may be used to propagate particles in the desired general direction, while allowing for the possibility of deviating from any one exact path. Certain mechanisms described herein, for example the wandering timer in some embodiments or other described elements, may be used to implement such generally gravitated, but not precisely determined path selection behavior.

As pointed out above, embodiments described herein may enable a particle filter to perform more realistically and/or more accurately. In some embodiments, such increased realism and/or accuracy may be achieved using fewer particles in the particle filter. Moreover, enhancements to a particle filter motion model described herein may significantly improve performance in that a given level of estimation accuracy may be achieved with fewer particles (e.g., compared to a random walk or memoryless directed random walk).

Figure 5:
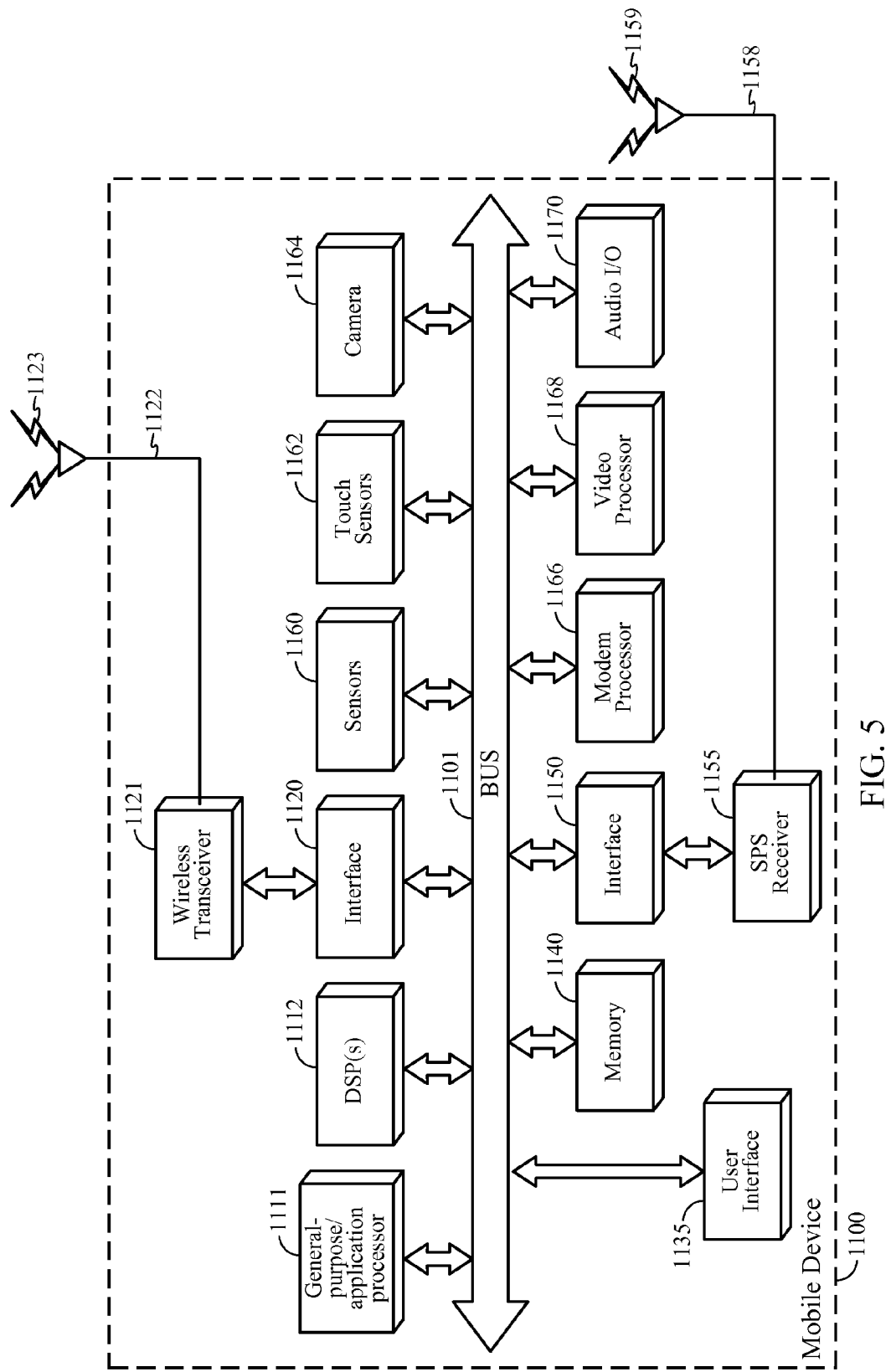
FIG. 5 is a schematic block diagram illustrating an exemplary mobile device, in accordance with an implementation.

FIG. 5 is a schematic diagram of a mobile device according to an embodiment. Mobile device 100 (FIG. 1) may comprise one or more features of mobile device 1100 shown in FIG. 5. In certain embodiments, mobile device 1100 may also comprise a wireless transceiver 1121 which is capable of transmitting and receiving wireless signals 1123 via an antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, WiFi, CDMA, WCDMA, LTE and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 5, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions or actions described herein, such as functions or actions described with reference to FIGS. 4A and 4B, may be performed in response to execution of one or more machine-readable instructions stored in memory 1140 (which may include any non-transitory storage medium, such as RAM, ROM, FLASH, or magnetic disk drive, just to name a few examples). The one or more instructions may be executable by general-purpose processor(s) 1111, specialized processors, or DSP(s) 1112 to perform functions or actions described herein. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, general-purpose processor(s) 1111 and/or DSP(s) 1112 may provide means for defining particles to represent possible states of a mobile device, said possible states including at least possible locations of said mobile device in an area; means for propagating at least some of said particles subject to edges of a first routing graph connecting nodes within a cell of a plurality of cells of the area in response to measurement signals according to said motion model to represent movement of said mobile device within said cell; and means for determining a direction of movement along a second routing graph connecting anchor nodes corresponding to and located in said cells based, at least in part, on said propagated particles. Similarly, general-purpose processor(s) 1111 and/or DSP(s) 1112 may execute machine-readable instructions stored on memory 1140 to perform blocks 382, 384 and/or 386 of FIG. 4A, or to perform any action (but not necessarily all actions) in process 400 illustrated in FIG. 4B.

Also shown in FIG. 5, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose processor 1111 in response to action from a user. Similarly, applications hosted on mobile device 1100 may store analog or digital signals on memory 1140 to present an output signal to a user.

In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) 1112 or general purpose processor 1111 in support of one or more applications such as, for example, applications directed to positioning or navigation operations. For example, DSP(s) 1112 or general purpose processor 1111 host one or more applications to incorporate direct and/or indirect measurements (e.g., received from sensors 1160) to propagate particles along edges of multiple routing graphs using techniques discussed above with reference to FIGS. 3 and 4 to estimate or predict a motion state of mobile device 1100. In a particular implementation, positioning assistance data, such as probability heatmaps, routing graphs, digital maps, routing graphs, identification of cells and locations of anchor nodes corresponding to cells, may be stored in memory 1140 to be accessed by applications hosted for DPS(s) 1112 or general purpose processor 1111 in support of positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 6:
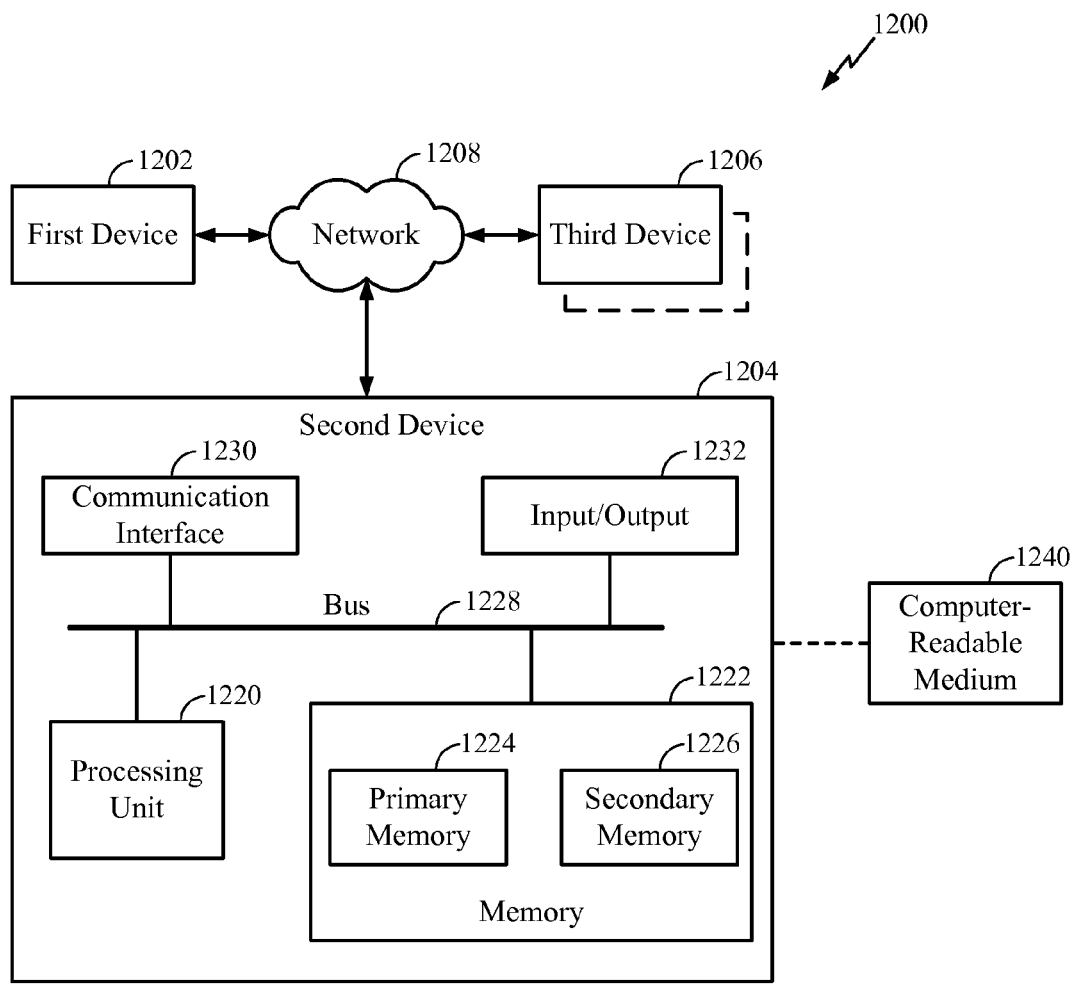
FIG. 6 is a schematic block diagram of an example computing platform according to an implementation.

FIG. 6 is a schematic diagram illustrating an example system 1200 that may include one or more devices configurable to implement techniques or processes described above, for example, in connection with FIG. 1. System 1200 may include, for example, a first device 1202, a second device 1204, and a third device 1206, which may be operatively coupled together through a wireless communications network 1208. In an aspect, first device 1202 may comprise a server capable of providing positioning assistance data such as, for example, a base station almanac and/or a routing graph. First device 1202 may also comprise a server capable of providing an LCI to a requesting mobile device based, at least in part, on a rough estimate of a location of the requesting mobile device. First device 1202 may also comprise a server capable of providing indoor positioning assistance data relevant to a location of an LCI specified in a request from a mobile device. Also, in an aspect, wireless communications network 1208 may comprise one or more wireless access points, for example. However, claimed subject matter is not limited in scope in these respects.

First device 1202, second device 1204 and third device 1206, as shown in FIG. 6, may be representative of any device, appliance or machine that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, or a mobile device in accordance with the examples described herein.

Similarly, wireless communications network 1208, as shown in FIG. 6, is representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228. Details of second device 1204 may describe aspects of any of servers 140, 150 or 155. In particular implementations, second device 1204—for example, the processing unit 1220, or the processing unit 1220 in combination with one or more elements of the memory 1222 or the computer readable medium 1240—may execute blocks 382, 384 and/or 386 of FIG. 4A, or perform any action (but not necessarily all actions) in process 400 illustrated in FIG. 4B. Furthermore, second device 1204 may store positioning assistance data such as, for example, routing graphs, digital maps, locations of transmitters, radio heatmaps, etc., in memory 1222 to be provided to mobile devices for performing positioning operations as discussed above.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium Second device 1204 may include, for example, a communication interface 1030 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising:
identifying particles representing possible states of a mobile device, said possible states including at least possible locations of said mobile device in an area;
determining a target anchor node of a plurality of anchor nodes in a first routing graph connecting a plurality of cells of the area based, at least in part, on measurement signals at the mobile device; and
propagating one or more of said particles subject to edges of a second routing graph connecting nodes within at least one cell of the plurality of cells to represent possible movement of said mobile device based, at least in part, on the determined target anchor node.

2. The method of claim 1, and further comprising receiving said measurement signals from one or more inertial sensors.

3. The method of claim 1, wherein the target cell is adjacent a current cell of the plurality of cells, and further comprising selecting the target cell further based, at least in part, on an estimated speed of movement of said mobile device along said first routing graph.

4. The method of claim 3, and further comprising selecting a previous cell as a subsequent target cell in response to detection that said mobile device has entered an adjacent cell other than said target cell.

5. The method of claim 3, and further comprising selecting a neighboring cell as a new target cell in response to detection that said mobile device has entered said target cell following expiration of a wander timer.

6. The method of claim 1, and further comprising determining a direction from a current cell of the plurality of cells to the target anchor node.

7. The method of claim 6, and further comprising determining likelihoods for transitioning over a plurality of edges of the second routing graph based, at least in part, on the determined direction, wherein the propagating is based, at least in part, on the determined likelihoods.

8. The method of claim 1, wherein said particles are indicative of a likelihood of a motion state of said mobile device including a location of said mobile device along an edge in the second routing graph.

9. The method of claim 1, wherein said first routing graph comprises a reduced routing graph, and wherein at least some of said plurality of anchor nodes are located at opportunities for change of direction.

10. The method of claim 1, wherein at least one of said anchor nodes is located at an intersection of hallways.

11. The method of claim 1, wherein movement along said first routing graph models natural pedestrian movement.

12. The method of claim 1, wherein at least one of said anchor nodes is located at an intersection of hallways.

13. A mobile device comprising:
one or more inertial sensors configured to generate measurement signals in response to movement; and
a processor configured to:
identify particles representing possible states of said mobile device, said possible states including at least possible locations of said mobile device in an area;
determine a target anchor node of a plurality of anchor nodes in a first routing graph connecting a plurality of cells of the area based, at least in part, on the measurement signals; and
propagate one or more of said particles subject to edges of a second routing graph connecting nodes within at least one cell of the plurality of cells to represent possible movement of said mobile device based, at least in part, on the determined target anchor node.

14. The mobile device of claim 13, wherein the target cell is adjacent a current cell of the plurality of cells, wherein the processor is further configured to select the target cell further based, at least in part, on an estimated speed of movement of said mobile device along said first routing graph.

15. The mobile device of claim 14, wherein the processor is further configured to select a previous cell as a subsequent target cell in response to detection that said mobile device has entered an adjacent cell other than said target cell.

16. The mobile device of claim 14, wherein the processor is further configured to select a neighboring cell as a new target cell in response to detection that said mobile device has entered said target cell following expiration of a wander timer.

17. The mobile device of claim 13, wherein the processor is further configured to determine a direction from a current cell of the plurality of cells to the target anchor node.

18. The mobile device of claim 17, wherein the processor is further configured to determine likelihoods for transitioning over a plurality of edges of the second routing graph based, at least in part, on the determined direction, wherein the propagating is based, at least in part, on the determined likelihoods.

19. The mobile device of claim 13, wherein said particles are indicative of a likelihood of a motion state of said mobile device including a location of said mobile device along an edge in the second routing graph.

20. The method of claim 13, wherein said first routing graph comprises a reduced routing graph, and wherein at least some of said plurality of anchor nodes are located at opportunities for change of direction.

21. The mobile device of claim 13, wherein said processor is further to select an adjacent target cell based, at least in part, on an estimated speed of movement of said mobile device along said second routing graph.

22. The mobile device of claim 21, wherein said processor is further configured to select a previous cell as a subsequent target cell in response to detection that said mobile device has entered an adjacent cell other than said adjacent target cell.

23. The mobile device of claim 21, wherein said processor is further configured to select a neighboring cell as a new target cell in response to detection that said mobile device has entered said adjacent target cell following expiration of a wander timer.

24. The mobile device of claim 13, wherein said processor is further to select an adjacent target cell based, at least in part, on said determined direction of movement along said second routing graph.

25. A non-transitory storage medium comprising machine-readable instructions stored thereon which are executable by a special purpose computing apparatus to:
identify particles representing possible states of a mobile device, said possible states including at least possible locations of said mobile device in an area;
determine a target anchor node of a plurality of anchor nodes in a first routing graph connecting a plurality of cells of the area based, at least in part, on measurement signals at the mobile device; and propagate one or more of said particles subject to edges of a second routing graph connecting nodes within at least one cell of the plurality of cells to represent possible movement of said mobile device based, at least in part, on the determined target anchor node.

26. A apparatus comprising:
means for identifying particles representing possible states of a mobile device, said possible states including at least possible locations of said mobile device in an area;
means for determining a target anchor node of a plurality of anchor nodes in a first routing graph connecting a plurality of cells of the area based, at least in part, on measurement signals at the mobile device; and
means for propagating one or more of said particles subject to edges of a second routing graph connecting nodes within at least one cell of the plurality of cells to represent possible movement of said mobile device based, at least in part, on the determined target anchor node.

27. The apparatus of claim 26, and further comprising means for receiving said measurement signals from one or more inertial sensors.

28. The apparatus of claim 26, wherein the target cell is adjacent a current cell of the plurality of cells, and further comprising means for selecting the target cell further based, at least in part, on an estimated speed of movement of said mobile device along said first routing graph.

29. The apparatus of claim 28, and further comprising means for selecting a previous cell as a subsequent target cell in response to detection that said mobile device has entered an adjacent cell other than said target cell.

30. The apparatus of claim 28, and further comprising means for selecting a neighboring cell as a new target cell in response to detection that said mobile device has entered said target cell following expiration of a wander timer.

31. The apparatus of claim 26, and further comprising means for determining a direction from a current cell of the plurality of cells to the target anchor node.

32. The apparatus of claim 31, and further comprising means for determining likelihoods for transitioning over a plurality of edges of the second routing graph based, at least in part, on the determined direction, wherein the propagating is based, at least in part, on the determined likelihoods.

33. The apparatus of claim 26, wherein said particles are indicative of a likelihood of a motion state of said mobile device including a location of said mobile device along an edge in the second routing graph.

34. The apparatus of claim 26, wherein said first routing graph comprises a reduced routing graph, and wherein at least some of said plurality of anchor nodes are located at opportunities for change of direction.

35. The apparatus of claim 26, wherein at least one of said anchor nodes is located at an intersection of hallways.

* * * * *